United States Patent
Dandekar et al.

(10) Patent No.: US 8,815,195 B2
(45) Date of Patent: Aug. 26, 2014

(54) CATALYTIC REDUCTION OF NOX WITH HIGH ACTIVITY CATALYSTS WITH PROPYLENE REDUCTANT

(71) Applicants: Ajit B. Dandekar, Falls Church, VA (US); Richard F. Socha, Yardley, PA (US); Richard L. Eckes, Madison, NJ (US); S. Beau Waldrup, Lumberton, TX (US)

(72) Inventors: Ajit B. Dandekar, Falls Church, VA (US); Richard F. Socha, Yardley, PA (US); Richard L. Eckes, Madison, NJ (US); S. Beau Waldrup, Lumberton, TX (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 0 days.

(21) Appl. No.: 13/938,523

(22) Filed: Jul. 10, 2013

(65) Prior Publication Data
US 2014/0044633 A1 Feb. 13, 2014

Related U.S. Application Data

(60) Provisional application No. 61/681,260, filed on Aug. 9, 2012.

(51) Int. Cl.
*B01D 53/56* (2006.01)
*B01D 53/94* (2006.01)
*B01D 53/86* (2006.01)

(52) U.S. Cl.
CPC .... *B01D 53/565* (2013.01); *B01D 2255/20715* (2013.01); *B01D 53/9418* (2013.01); *B01D 2258/01* (2013.01); *B01D 53/8628* (2013.01); *B01D 2251/208* (2013.01); *B01D 2255/2092* (2013.01); *B01D 2258/0283* (2013.01)
USPC ..................................................... 423/239.1

(58) Field of Classification Search
CPC .. B01D 53/56; B01D 53/565; B01D 53/8625; B01D 53/8628; B01D 53/8643; B01D 53/865
USPC ................ 423/239.1; 422/171, 172, 177, 180
See application file for complete search history.

(56) References Cited

U.S. PATENT DOCUMENTS

| 4,210,628 A | 7/1980 | Ninomiya et al. |
| 5,589,147 A | 12/1996 | Farnos et al. |

(Continued)

FOREIGN PATENT DOCUMENTS

| CA | 2079176 A1 | 4/1993 |
| EP | 0077424 A1 | 4/1983 |

(Continued)

OTHER PUBLICATIONS

Aksoylu et al., "Highly Dispersed Activated Carbon Supported Platinum Catalysts Prepared by OMCVD: A Comparison With Wet Impregnated Catalysts", Applied Catalysis A: General, vol. 243, pp. 357-365 (2003).

(Continued)

*Primary Examiner* — Timothy Vanoy
(74) *Attorney, Agent, or Firm* — Glenn T. Barrett

(57) ABSTRACT

Methods and systems are provided for selective catalytic reduction of NOx with a low molecular low molecular weight hydrocarbon, e.g., propylene, as a reductant using a catalyst system including two catalysts. An exhaust stream containing an amount of NOx from a combustion operation is provided. A portion of the exhaust stream and a reductant stream including a low molecular weight hydrocarbon is introduced to a first catalytic reactor, which comprises a first catalyst including alumina loaded with silver. The NOx-reduced exhaust stream from the first catalyst is then directed to a second catalyst including zirconia loaded with at least one metal.

16 Claims, 2 Drawing Sheets

(56) References Cited

U.S. PATENT DOCUMENTS

| | | | |
|---|---|---|---|
| 6,541,408 | B2 | 4/2003 | Chang et al. |
| 7,011,801 | B2 | 3/2006 | Van Den Brink et al. |
| 7,163,668 | B2 | 1/2007 | Bartley et al. |
| 7,485,271 | B2 * | 2/2009 | Golunski et al. ............ 423/213.2 |
| 7,743,602 | B2 | 6/2010 | Kalyanaraman et al. |
| 7,803,338 | B2 | 9/2010 | Socha et al. |
| 7,891,171 | B2 | 2/2011 | Cho et al. |
| 7,976,697 | B2 | 7/2011 | Krishnamoorthy et al. |
| 2005/0163691 | A1 * | 7/2005 | Kelkar et al. .............. 423/239.1 |
| 2007/0092421 | A1 | 4/2007 | Hancu et al. |
| 2008/0167178 | A1 | 7/2008 | Malyala et al. |
| 2008/0241006 | A1 | 10/2008 | Sato |
| 2009/0081097 | A1 | 3/2009 | Mochida et al. |
| 2009/0304566 | A1 | 12/2009 | Golden et al. |

FOREIGN PATENT DOCUMENTS

| | | | |
|---|---|---|---|
| EP | 0719580 | A1 | 7/1996 |
| EP | 2298434 | A1 | 3/2011 |
| EP | 2371450 | A1 | 10/2011 |
| WO | 0174475 | A1 | 10/2001 |

OTHER PUBLICATIONS

PCT Search Report issued Oct. 22, 2013 in corresponding PCT Application No. PCT/US2013/051638 (3pp).

PCT Written Opinion issued Oct. 22, 2013 in corresponding PCT Application No. PCT/US2013/051638 (6 pp).

PCT Search Report issued Oct. 22, 2013 in related PCT Application No. PCT/US2013/051642 (4 pp).

PCT Written Opinion issued Oct. 22, 2013 in related PCT Application No. PCT/US2013/051642 (5 pp).

PCT Search Report issued Oct. 22, 2013 in related PCT Application No. PCT/US2013/051648 (4 pp).

PCT Written Opinion issued Oct. 22, 2013 in related PCT Application No. PCT/US2013/051648 (4 pp).

PCT Application No. PCT/US2013/051652, Communication from the International Searching Authority, Form PCT/ISA/210, dated Sep. 24, 2013, 3 pages.

PCT Application no. PCT/US2013/051652, Written Opinion of the International Searching Authority, Form PCT/ISA/237, dated Sep. 24, 2013, 5 pages.

* cited by examiner

CATALYTIC REDUCTION OF NOX WITH HIGH ACTIVITY CATALYSTS WITH PROPYLENE REDUCTANT

BACKGROUND

1. Field

The presently disclosed subject matter relates to methods and systems for removing pollutant gases from the exhaust gas stream formed by a combustion process, such as internal combustion engines, furnaces, power plants, and so forth. Particularly, the disclosed subject matter is related to the use of zeolite catalysts loaded with various of metals for selective catalytic reduction of nitrogen oxides (NOx) from the exhaust gases resulting directly or indirectly from a combustion process in the exploration, production, refining, manufacture, supply, transport, formulation or blending of petroleum, petrochemicals or the direct products thereof.

2. Description of Related Art

Combustion devices in commercial applications, such as those in the petroleum and petrochemical processing field, which includes the exploration, production, refining, manufacture, supply, transport, formulation or blending of petroleum, petrochemicals, or the direct products thereof, are a source of NOx emissions. A continuing effort has been made over the years to develop methods and systems to remove pollutant gases from exhaust gases produced by combustion unit operations.

Increasingly stringent environmental regulations have been enacted world-wide in an effort to reduce the emission of pollutant gases into the atmosphere from combustion equipment used by numerous unit operations within a commercial operation. Of particular interest is the production of nitrogen oxides (NOx).

Nitrogen oxides (NOx) are produced, for example, when nitrogen reacts with oxygen within a combustion chamber under high temperature and pressure conditions. NOx can also be produced, for example, in fluid catalytic converters (FCCs) and furnaces due to combustion of nitrogen from FCC feeds, heating oil, and/or fuel oil. Such nitrogen oxides can include either one or a combination of nitrogen monoxide and nitrogen dioxide.

Various selective catalytic reduction (SCR) methods have been developed in an effort to reduce NOx emissions. SCR is a catalytic technique to convert NOx to diatomic nitrogen, $N_2$, and water, $H_2O$. Typically, a fluid reductant—such as anhydrous ammonia, aqueous ammonia or urea—is added to a stream of exhaust gas and absorbed onto a catalyst.

However, such known techniques can be expensive to operate and/or may have limited capacity or efficiency. As such, there is a continued need for improved methods and apparatus for removing NOx from the exhaust gas stream of a combustion device, particularly those found in chemical processing and/or petrochemical refining operations.

SUMMARY OF THE INVENTION

In accordance with one aspect of the disclosed subject matter, a method for selective catalytic reduction of NOx is provided. The method includes providing an exhaust stream containing an amount of NOx from a combustion operation. A portion of the exhaust stream and a reductant stream including a low molecular weight hydrocarbon are introduced to a first catalytic reactor, which comprises a first catalyst including alumina loaded with silver. The reductant stream and the portion of the exhaust stream being introduced to the first catalytic reactor are at suitable operating conditions to reduce the amount of NOx in the exhaust stream. The NOx-reduced exhaust stream from the first catalyst is then directed to a second catalyst including zirconia loaded with at least one metal. In one embodiment, the low molecular weight hydrocarbon is propylene. In various embodiments as discussed below, for purpose of illustration and not limitation, propylene is used as an example of the low molecular weight hydrocarbon, and it is understood that other similar low molecular weight hydrocarbons can also be used therein. In some embodiments, the first catalytic reactor includes a vessel or similar structure, and the second catalyst is within the structure of the first catalytic reactor. In other embodiments, the second catalyst is in a second catalytic reactor located downstream of the first catalytic reactor.

The source of the exhaust stream can be a refinery component, selected from the group consisting of a combustion furnace, a boiler, a heater turbine, and a fluid catalytic cracking unit. The first catalytic reactor can be located near a flue of the at least one refinery component to maintain the first catalytic reactor at an operating temperature between about 300° C. and 400° C. Alternatively, the first catalytic reactor can be maintained at an operating temperature between about 300° C. and 400° C. by heating or cooling the exhaust stream.

The exhaust stream can include about 0.1% to about 20% oxygen, e.g., about 2% to about 9% oxygen, and about 1% to about 10% water, e.g., about 5% water. Molar ratio of propylene to NOx in the reductant stream can be between about 0.5 to 2. The operating temperature of the first catalytic reactor can be between about 300° C. and about 400° C., for example, at about 400° C. In some embodiments, hydrogen is provided in the reductant stream, for example, at a concentration of up to 5000 ppm. The reductant stream and the at least a portion of the exhaust stream collectively can have a gaseous hourly space velocity of between 30K cc per hour and 120K cc per hour through the first catalytic reactor.

In some embodiments, the first catalyst comprises 2 wt. % silver loaded on alumina. In other embodiments, the loaded metal of the second catalyst is selected from the group consisting of copper, cerium, and tungsten. In particular embodiments, the second catalyst includes $Cu/W/ZrO_2$ and/or $Ce/ZrO_2$. As used herein, the loaded metal can be present in metal oxide form, depending on the preparation methods of the second catalyst.

In accordance with another aspect of the disclosed subject matter, a system for selective catalytic reduction of NOx is provided. The system includes a conduit in fluid communication with a source of an exhaust stream from a combustion operation, the exhaust stream containing an amount of NOx; a source of a reductant stream including a low-molecular weight hydrocarbon; a first catalytic reactor in fluid communication with the conduit and the source of the reductant stream, the first catalytic reactor comprising a first catalyst including alumina loaded with silver; an outlet in fluid communication with the first catalytic reactor to direct the NOx-reduced exhaust stream from the first catalytic reactor; and a second catalyst including zirconia loaded with at least one metal, the second catalyst in fluid communication with the first catalyst. In some embodiments, the first catalytic reactor includes a vessel or similar structure, and the second catalyst is within the structure of the first catalytic reactor. In other embodiments, the second catalyst is in a second catalytic reactor located downstream of the first catalytic reactor. The various embodiments regarding the source of the exhaust stream, the operating conditions of the first reactor, the first and second catalysts, and other parameters of the method discussed above are also applicable to the system disclosed herein.

DETAILED DESCRIPTION

Figure 1:
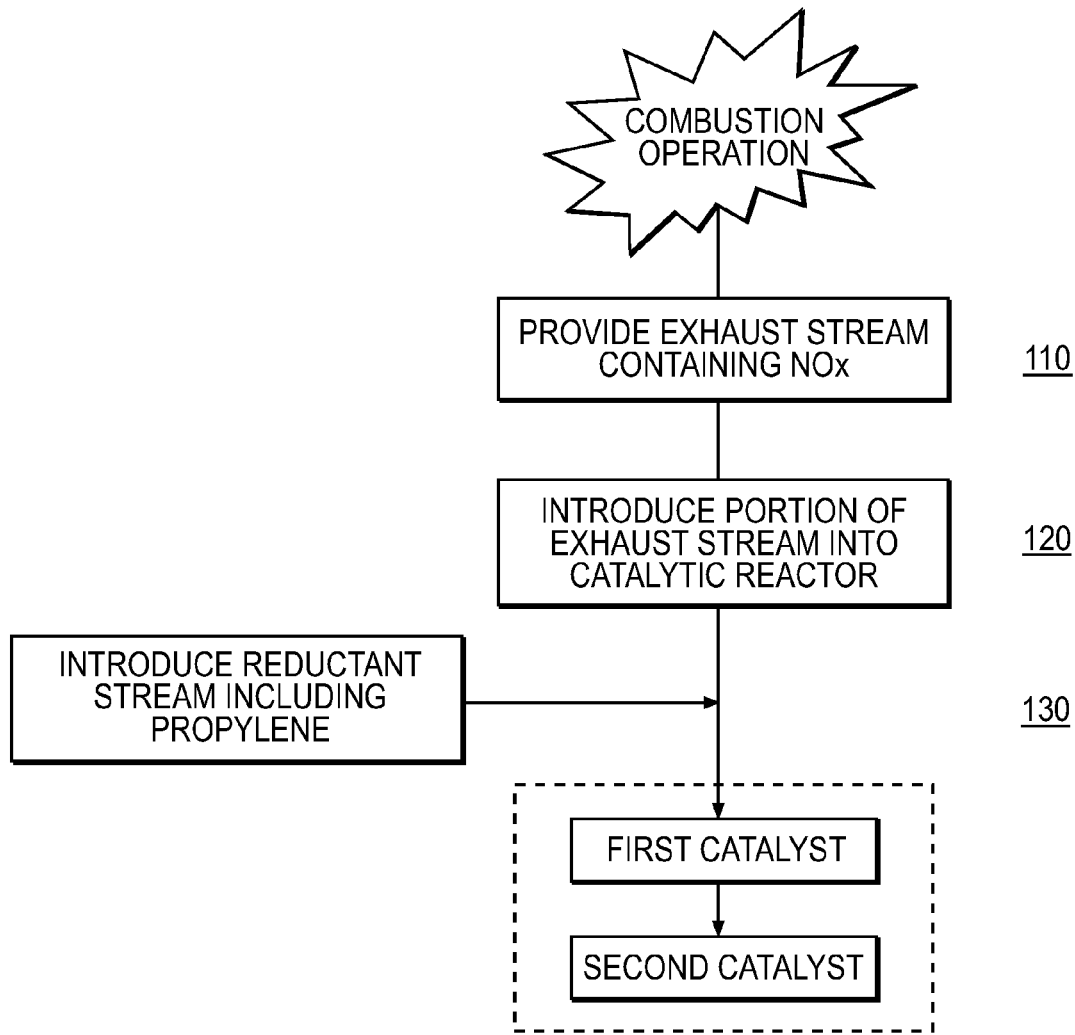
FIG. 1 is a flow diagram of a method for NOx reduction according to an embodiment of the disclosed subject matter.

As used herein, the term "NOx" refers generally to a compound consisting of nitrogen and at least one oxygen molecule, and particularly to one or more of nitrogen monoxide, nitrogen dioxide and di-nitrogen or nitrous oxide. As used herein, the term "NOx-reduced stream" includes a fluid stream having a reduction of such nitrogen monoxide, nitrogen dioxide, and nitrous oxide.

As used herein, the term "combustion operation" refers to any process wherein an energy-storing material is burned to produce energy or other byproduct. For example, a "combustion operation" can include a unit operation within a commercial operation or the like in which NOx is emitted as the result of a combustion reaction. A combustion operation can include, but is not limited to, the operation of a combustion engine, furnace, boiler, heater and a turbine. A combustion operation can further include a fluid catalytic converter ("FCC") regenerator operation, in which NOx is found in a FCC regenerator exhaust stream.

As used herein, the term "GHSV" refers to term "gaseous hourly space velocity" and is the ratio of the gaseous volumetric flow rate, at standard conditions of 60° F. and one atmosphere of pressure, to the catalyst volume.

As used herein, the term "commercial operation" refers to any operation in which a commodity (e.g., electricity), chemical, petroleum or other article of commercial interest (including a chemical intermediate to an article of commerce interest) is manufactured, produced or otherwise provided. The term "commercial operation" can include the exploration, production, refining, manufacture, supply, transport, formulation or blending of petroleum, petrochemicals, or the direct products thereof. As embodied herein, the article of commercial interest can be manufactured, produced or otherwise provided in an industrial scale.

As used herein, the term "provided in an industrial scale" refers to a scheme in which, for example, gasoline or other product of commercial interest is produced on a generally continuous basis (with the exception of necessary outages for plant maintenance or upgrades) over an extended period of time (e.g., over at least a week, or a month, or a year) with the expectation or object of generating revenues from the sale or distribution of the product of commercial interest, regardless of whether for profit or not for profit. Production in an industrial scale is distinguished from laboratory or pilot plant settings which are typically maintained only for the limited period of the experiment or investigation, and are conducted for research purposes and not with the expectation of generating revenue from the sale or distribution of the end product produced thereby.

The term "about" as used herein in reference to quantitative measurements refers to a value one of ordinary skill in the art would consider equivalent to the recited value (i.e., having the same function or result), or a value that can occur, for example, through typical measurement and process procedures.

In accordance with one aspect of the disclosed subject matter, a method for selective catalytic reduction of NOx is provided. The method includes providing an exhaust stream from a combustion operation, the exhaust stream containing an amount of NOx. A portion of the exhaust stream and a reductant stream including a low molecular weight hydrocarbon introduced to a first catalytic reactor, which comprises a first catalyst including alumina loaded with silver. The reductant stream and the portion of the exhaust stream being introduced to the first catalytic reactor are at suitable operating conditions to reduce the amount of NOx in the exhaust stream. The NOx-reduced exhaust stream from the first catalyst is then directed to a second catalyst including zirconia loaded with at least one metal.

In accordance with another aspect of the disclosed subject matter, a system for selective catalytic reduction of NOx is provided. The system includes a conduit in fluid communication with a source of an exhaust stream from a combustion operation, the exhaust stream containing an amount of NOx; a source of a reductant stream including a low-molecular weight hydrocarbon; a first catalytic reactor in fluid communication with the conduit and the source of the reductant stream, the first catalytic reactor comprising a first catalyst including alumina loaded with silver; an outlet in fluid communication with the first catalytic reactor to direct the NOx-reduced exhaust stream from the first catalytic reactor; and a second catalyst including zirconia loaded with at least one metal, the second catalyst in fluid communication with the first catalyst. In one embodiment, the low molecular weight hydrocarbon is propylene. In some embodiments, the second catalyst is within the first catalytic reactor. In other embodiments, the second catalyst is in a second catalytic reactor located downstream of the first catalytic reactor.

Particular embodiments of the method and system are described below, with reference to FIGS. 1 and 2, for purposes of illustration, and not limitation. For purposes of clarity the method and system are described concurrently and in conjunction with each other.

In one embodiment, and with reference to FIGS. 1 and 2, an exhaust stream 220 containing NOx is provided (step 110) from a combustion operation 210. The combustion operation 210 can be any combustion operation that produces an exhaust stream containing NOx. The combustion operation can be, for example, a combustion operation in a refining operation involving a refinery component. Such refinery component can include a combustion furnace, a boiler, a heater turbine, or a fluid catalytic cracking unit among others. The combustion operation generally has a flue or similar outlet, such that the exhaust stream 220 exits the combustion operation via the flue outlet.

The exhaust stream 220 can include other gases in addition to NOx. For example, the exhaust stream can include an amount of oxygen, water, and other byproducts of the combustion operation. In the refinery setting, for example, the exhaust stream can also contain trace amounts of hydrocarbons. For purpose of example and not limitation, the exhaust stream can include about 0.1% to about 20% oxygen, e.g., about 2% to about 9% oxygen, and about 1% to about 10% water, e.g., about 5% water.

The exhaust stream 220 is introduced (step 120) to a first catalytic reactor 230. For example, and as depicted in FIG. 2, the first catalytic reactor 230 includes a vessel of suitable construction for the intended operating conditions, and is in fluid communication with a conduit 231 extending from the source of the exhaust stream. The conduit 231 can be attached to the first catalytic reactor by suitable means and provided with a suitable inlet adapter as needed for flow of the exhaust stream to the first catalytic reactor 230. For example, the conduit 231 can be threaded, welded, or otherwise attached to a port in the first catalytic reactor 230. In one embodiment, the first catalytic reactor 230 is located proximate a refinery flue outlet of the at least one refinery component to maintain the first catalytic reactor at an operating temperature between about 300° C. and about 400° C., as described further below. Alternatively, the exhaust stream 220 can first pass through one or more valves or treatment devices 270 prior to the first catalytic reactor 230. For example, the exhaust stream can pass through a heat exchanger to control the temperature of the exhaust stream. Additionally or alternatively, a pump can be used to provide a desired flow rate to the first catalytic reactor.

As previously noted, a reductant stream 265 is also introduced (step 130) to the first catalytic reactor 230. The reductant stream 265 includes an effective amount of low molecular weight hydrocarbon, such as propylene, to reduce NOx. In an exemplary embodiment, the amount of propylene in the reductant stream 265 can be an amount sufficient to provide about a 0.5 to 2 molar ratio of propylene to the NOx in the exhaust stream 220. For example, if the amount of NOx in the exhaust stream 220 is 1000 ppm, the amount of propylene in the reductant stream 265 can be between about 500-2000 ppm.

The reductant stream can be provided by a reductant stream source 260, such as a storage vessel for storing propylene. For example, propylene can be stored as a liquid, and can be first vaporized before being introduced to the first catalytic reactor. The first catalytic reactor 230 can have a port 234 in fluid communication with the reductant stream source 260 to receive the reductant stream 265. The port 234 can include a valve, or a plurality of valves to regulate the flow rate of the reductant stream.

As previously noted, and as embodied herein, the first catalytic reactor 230 includes a first catalyst 240 including alumina loaded with silver. The first catalyst 240 can be structurally arranged, for example, on catalyst beds or the like within the first catalytic reactor 230. The first catalyst 240 can be in a variety of suitable structural or solid forms, such as powders, pellets, particles, washcoated or formed monoliths such as a honeycomb structure and the like, to allow the exhaust stream to contact the catalyst. The first catalyst 240 can be prepared using procedures known in the art. For example, γ-alumina substrate can be prepared by a complexing agent-assisted sol gel method, followed by calcination. Silver can be loaded onto the γ-alumina via incipient wetness impregnation techniques, for example, using silver nitrate or silver sulfate solution to impregnate alumina, followed by calcination at appropriate temperature to obtain the target level of loading. This is a conventional wet impregnation technique. For example, silver can be loaded at about 2 wt. % based on the total weight of the first catalyst.

As the mixture of the portion of the exhaust stream and the reductant stream contact the first catalyst at suitable operating conditions, at least a portion of the NOx contained in the exhaust stream is reduced. The reaction product in this phase can include nitrous oxide ($N_2O$). The NOx reduced stream containing the reaction product of this phase and any unreacted NOx can be directed to a second catalyst, thereby converting the NOx to $N_2$, as will be further described below.

As noted above, the second catalyst 340 can include zirconia loaded with at least one metal. The second catalyst 340 can be structurally arranged, for example, on catalyst beds or the like in the second catalytic reactor 330, and can be in the form of powders, pellets, particles, washcoated or formed monoliths such as a honeycomb structure, and the like. The loaded metal of the second catalyst can be copper, cerium, tungsten, or mixtures thereof. In particular embodiments, the second catalyst includes $Cu/W/ZrO_2$ and/or $Ce/ZrO_2$.

Similar to the preparation of the first catalyst, the second catalyst can be prepared by permeating into the zirconia an amount of a salt containing the selected metal. The metal-modified catalyst is then calcinated in air to obtain a predetermined weight loading of the metal or metals loaded into the substrate.

Figure 2A:
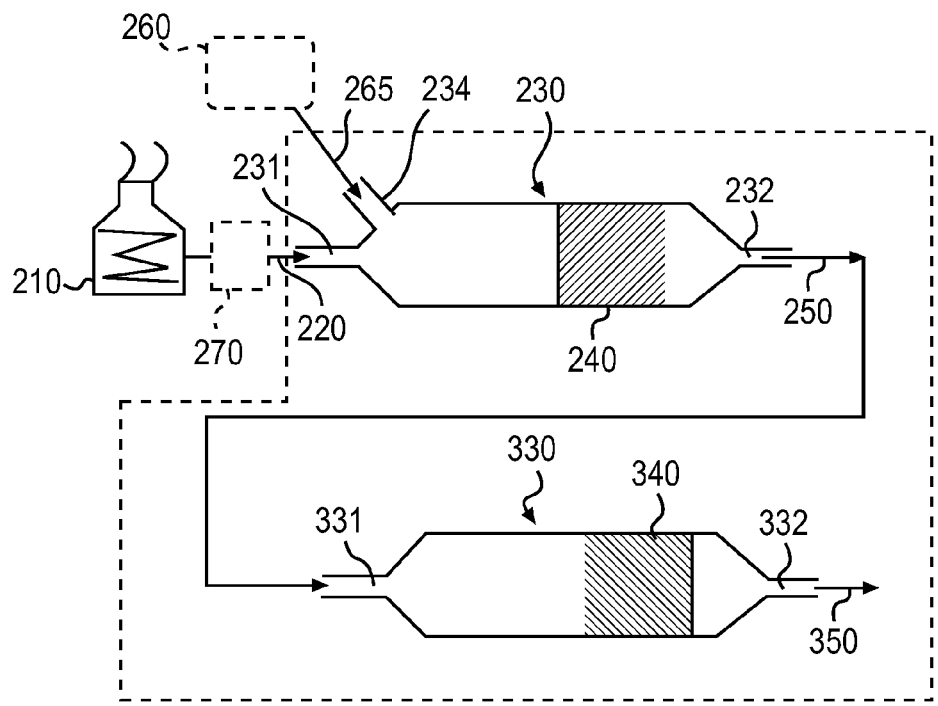
FIG. 2A is a schematic diagram of a system for NOx reduction according to an embodiment of the disclosed subject matter.

Although depicted as a separate structure, the second catalytic reactor can be provided within the same structure as the first catalytic reactor as shown with dotted lines in FIG. 2A. As used herein, a catalytic reactor is a structural element that includes one or more catalyst. As such, a catalytic reactor can include a vessel or similar structure of suitable construction containing the desired catalyst.

Figure 2B:
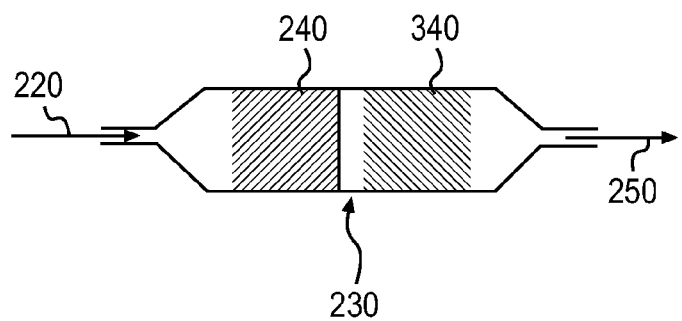
FIG. 2B is a schematic diagram of a system for NOx reduction according to an alternative embodiment of the disclosed subject matter.

As depicted in FIGS. 2A and 2B, the first catalyst and the second catalyst can be in a first catalytic reactor and a second catalytic reactor, respectively (FIG. 2A), or in the same catalytic reactor, i.e., the first catalytic reactor (FIG. 2B). The second catalytic reactor 330 can be located downstream from the first catalytic reactor 230, for example, at a distance downstream from the first catalytic reactor 230 such that the operating temperature of the second catalytic reactor 330 can be cooler than that of the first catalytic reactor. Additionally or alternatively, the NOx-reduced exhaust stream 250 can flow through a heat exchanger to achieve a desired temperature at the second catalytic reactor 330.

If the second catalyst is in the second catalytic reactor as illustrated in FIG. 2A, additional reductant stream can be introduced upstream of the second catalytic reactor. If the first catalyst and the second catalyst are both in the first catalytic reactor as illustrated in FIG. 2B, the two catalysts can be arranged with the second catalyst in a relative downstream position. The first catalyst and the second catalyst can be stacked directly against each other, or have a gap therebetween.

Depending on the configurations of the first catalyst and second catalyst, the operating temperature can be varied. For example, where both the first catalyst and the second catalyst are in the first catalytic reactor, as illustrated in FIG. 2B, the operating temperature of the first catalytic reactor 230 can be between about 250° C. and about 550° C. Alternatively, if the first catalyst is in the first catalytic reactor and the second catalyst is in the second catalytic reactor, the operating temperature for each of the catalytic reactors can be same or different. Additionally, a narrower range of suitable temperature can be determined in which the activity of the catalyst(s) used exhibits a maximum, e.g., by measuring NOx percent conversion at different temperatures. For example, the operating temperature of the first catalytic reactor can be about 500° C. when only the first catalyst is loaded therein, and about 400° C. when both the first catalyst and the second catalyst are loaded therein.

The desired operating temperature of the first catalytic reactor (and/or the second catalytic reactor, if present) can be obtained in various ways. Combustion operations, such as in refinery equipment, often produce flue gas in the temperature range above 500° C. As such, and in one embodiment, the operating temperature of the first catalytic reactor 230 can be maintained at the desired range or value by locating the first catalytic reactor 230 downstream from the combustion operation 210 at a location where the exhaust stream 220 is expected to have such a temperature range or value. For example, this location can be somewhere downstream of the combustion operation 210, with the exhaust stream 220 exiting the combustion operation 210 and flowing through the conduit 231 to the first catalytic reactor 230 after the exhaust stream has lost certain amount of thermal energy. Alternatively, the desired operating temperature can be maintained with the use of a heat exchanger 270 or the like. The heat exchanger 270 can be located downstream from the exhaust flue source (i.e., the flue of the combustion operation 210) and upstream from the first catalytic reactor 230. Various mechanisms and devices for modulating the temperature of a flue gas are known. For example, an air heater or economizer can be disposed in the stream. In some embodiments, the heat exchanger uses byproduct heat or thermal energy from the refinery for increased efficiency. Other suitable devices and techniques can also be suitable to maintain the operating temperature.

As demonstrated in the Examples below, the system and method disclosed herein can achieve NOx reduction of greater than 90%. The flow rate of the exhaust stream 220 through the first catalytic reactor 230 (and/or the second catalytic reactor, if present) therefore can be controlled or maintained at a desired level through the first catalytic reactor 230 to utilize or maximize the capacity of the first (and/or the second) catalytic reactor. For example, flow regulators and/or pumps or the like, such as an induced-draft fan can be disposed in fluid communication with the system disclosed herein to maintain a desired flow rate through the first catalytic reactor 230. With reference to the disclosed system and method, the GHSV can be, for example, between about 30K cc per hour and about 120K cc per hour based on catalyst provided in powder form. Likewise, the GHSV can be least 5000 cc per hour, for example where the catalyst is provided on washcoated or bulk monoliths.

After the NOx-reduced exhaust stream flows through the second catalyst, the further reduced NOx-reduced exhaust stream 350 (in FIG. 2A, or 250, in FIG. 2B) can be directed away from the second catalyst through the outlet conduit 332 (in FIG. 2A, or 232 in FIG. 2B). The further reduced NOx-reduced exhaust stream can then be released into the atmosphere, for example through a stack.

EXAMPLE

The present application is further described by means of the examples, presented below. The use of such examples is illustrative only and in no way limits the scope and meaning of the invention or of any exemplified term. Likewise, this application is not limited to any particular preferred embodiments described herein. Indeed, many modifications and variations of the invention will be apparent to those skilled in the art upon reading this specification. The invention is to be understood by the terms of the appended claims along with the full scope of equivalents to which the claims are entitled.

In a first example, a gas mixture consisting of about 1000 ppm of NO, about 2% to about 9% $O_2$, and about 5% $H_2O$ is treated with a catalyst system as described above. The first catalyst is 2% Ag/Alumina and the second catalyst is tabulated in Table 1 below. The first catalyst and the second catalyst are stacked in series in a same catalytic reactor, with the first catalyst positioned relatively upstream of the second catalyst. The reductant stream includes propylene at 1000-2000 ppm, and hydrogen at 2000 ppm. The total flow rate is such that the GHSV ranged from 30K to 120K cc per hour. The operating temperature is about 400° C.

The first catalyst and the second catalyst were prepared with standard wet impregnation technique as described above. Table 1 provides observed NO conversions of the gas mixture referenced above for the different operating conditions as summarized below.

TABLE 1

| Second Catalyst | NOx Reduction (%) |
| --- | --- |
| 1% Cu/W/$ZrO_2$ | 93 |
| 2% Ce/$ZrO_2$ | 93 |

As seen in Table 1, very high NO conversion rate were achieved using propylene as a reductant, and a catalyst system including Ag/Alumina as the first catalyst and 1% Cu/W/$ZrO_2$ or 2% Ce/$ZrO_2$ as the second catalyst.

The presently disclosed subject matter is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

The invention claimed is:

1. A method for selective catalytic reduction of NOx comprising:
   providing an exhaust stream from a combustion operation, the exhaust stream containing an amount of NOx;
   introducing at least a portion of the exhaust stream and a reductant stream including propylene to a first catalytic reactor comprising a first catalyst including alumina loaded with silver, the reductant stream and the at least a portion of the exhaust stream being introduced to the first catalytic reactor at suitable operating conditions to reduce the amount of NOx in the exhaust stream; and
   directing the NOx-reduced exhaust stream from the first catalyst to a second catalyst including zirconia loaded with at least one metal.

2. The method of claim 1, wherein the first catalytic reactor includes a vessel, and the second catalyst is within the vessel of the first catalytic reactor.

3. The method of claim 2, wherein the operating temperature of the first catalytic reactor is between about 200 ° C. and about 450° C.

4. The method of claim 2, wherein the operating temperature of the first catalytic reactor is about 400 ° C.

5. The method of claim 1, wherein the second catalyst is in a second catalytic reactor located downstream of the first catalytic reactor.

6. The method of claim 1, wherein the exhaust stream includes between about 0.5% and about 20% oxygen and about 1-10% water.

7. The method of claim 1, wherein the reductant stream provides a molar ratio of propylene to NOx of about 0.5 to 2.

8. The method of claim 1, wherein the reductant propylene stream comprises up to about 500-5000 ppm of hydrogen.

9. The method of claim 1, wherein the first catalyst comprises 2 wt. % silver loaded on alumina.

10. The method of claim 1, wherein the loaded metal of the second catalyst is selected from the group consisting of copper, cerium, and tungsten.

11. The method of claim 1, wherein the second catalyst is selected from the group consisting of Cu/W/$ZrO_2$ and Ce/$ZrO_2$.

12. The method of claim 1, wherein the amount of NOx is reduced by at least 90%.

13. The method of claim 1, wherein the first catalytic reactor is located relative a refinery flue of the at least one refinery component to maintain the first catalytic reactor between 200° C. and 400° C.

14. The method of claim 1, wherein the operating temperature of the first catalytic reactor is maintained between 200° C. and 400° C. by heating or cooling the exhaust stream.

15. The method of claim 1, wherein introducing the propylene reductant stream and the exhaust stream collectively have a gaseous hourly space velocity of between 30K cc per hour and 120K cc per hour through the first catalytic reactor.

16. The method of claim 1, wherein the exhaust stream is provided from at least one refinery component selected from the group consisting of a combustion furnace, a boiler, a heater turbine, and a fluid catalytic cracking unit.

\* \* \* \* \*